2,852,556

BIS(p-AMINOPHENYL)BUTADIENE AND DERIVATIVES

Leon Katz, Westfield, Delton W. Hein and John E. Pretka, Somerville, and Robert S. Long, Bound Brook, N. J., assignors to American Cyanamid Company, New York, N. Y., a corporation of Maine No Drawing. Application September 7, 1954
Serial No. 454,642

12 Claims. (Cl. 260—518)

This invention relates to new intermediates and to the dyes, pigments and brighteners derived therefrom. More specifically, it relates to 1,4-bis(para-aminophenyl)-butadienes, to 1,4-bis(para-aminophenyl)butadiene-1-carboxylic acid and -1,4-dicarboxylic acid, to the corresponding acyl and alkylamino compounds, and to azo dyes and pigments derived from the free amino compounds.

The butadiene system has previously been known in dyestuff chemistry only in certain isolated cases, such as the light-sensitive cyanine dyes which are used as photosensitizers and desensitizers.

We have found that 1,4-bis(para-aminophenyl)-1,3-butadienes and their ring substitution products are good intermediates for the preparation of dyes, pigments and brighteners, and that the various coloring matters thus obtained have excellent properties. The acylamino and alkylamino derivatives of the diphenylbutadiene system fluoresce and are good brighteners. The azo derivatives obtained from 1,4-bis(para-aminophenyl)butadiene are good dyes of shades which in many cases are unusually deep and very useful.

Fluorescence alone is not enough to make good brighteners. The compound must also be substantive to the cloth, must be itself relatively uncolored, and must fluoresce in the visible in the blue range in order to cancel out the natural yellow of the cloth. While diphenylbutadiene is uncolored, the addition of the strongly auxochromic amino groups would have been expected to produce color in the molecule. It is unexpected to find that the corresponding acylamino and alkylamino derivatives not only are relatively uncolored but that they possess good substantivity to the cloth, fluorescence in the blue range of the visible, and have good fastness properties. These properties would not be predicted.

While stilbene compounds have been used in dyes and brighteners, there were definite reasons to expect that the diphenylbutadiene structure would be unusable. The high reactivity of the butadiene system leads one to an expectation that the dyes derived from diphenylbutadiene would be much more unstable. This however is not observed. Increase in conjugation normally has the effect of shifting the color of compounds into the visible. Many stilbene brighteners are already pale yellow and it was expected that the 1,4-diphenylbutadiene compounds would have a pronounced color in the visible. We were therefore very much surprised to find that this was not so, and that the 1,4-bis(para-acylamino- and alkylaminophenyl)butadienes are still relatively uncolored.

Substantivity is believed in the art to be a function of hydrogen bonding between the dye and the fiber and is therefore a function of the relative geometry of the fiber and dye molecules. The increase in the chain length of the butadiene derivatives of our invention over the corresponding stilbene derivatives made it unpredictable that the compounds of our invention would be substantive. They are in fact, however, quite substantive.

For certain uses where water solubility is important derivatives can be prepared in which a carboxy group is substituted on the butadiene chain. In other cases, where such solubility is not desired, as for example in pigments and brighteners for non-cellulosic fibers, the best intermediate is a 1,4-bis(para-aminophenyl)-1,3-butadiene free of carboxy groups.

Uncarboxylated products are prepared by the condensation of a p-acylaminobenzaldehyde with succinic anhydride to give a 1,4-bis(p-acylaminophenyl) 1,3-butadiene which may be hydrolyzed to the free amino compound. Alternatively, a p-nitrobenzaldehyde is condensed with succinic anhydride, and the resultant 1,4-bis(p-nitrophenyl)-1,3-butadiene on reduction yields the same compound. If desired, this can then be acylated to give an acyl derivative. There are thus two alternative routes available to either the acylamino or the aminophenylbutadienes and the choice of the route will depend on the circumstances. If the acyl group is such that it will be unaffected by the reaction conditions, the procedure starting with an acylaminobenzaldehyde is the best one to use to obtain an acyl derivative. Where the acyl group may be affected an alternative route is chosen. These reactions can be illustrated by the following equations:

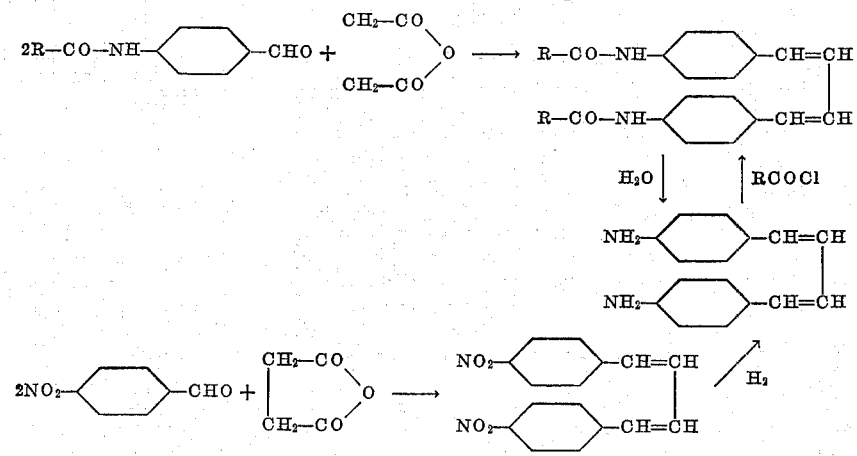

Carboxylated products are made by modification of the above procedures using slightly different intermediates. A mono-carboxy derivative is prepared by the condensation of p-nitrocinnamaldehyde on p-nitrophenyl acetic acid. The resultant 1,4-bis(p-nitrophenyl)-1,3-butadiene-1-carboxylic acid is readily reduced to the corresponding amino compound. A 1,4-bis(p-aminophenyl)-1,3-butadiene-1,4-dicarboxylic acid is prepared by the condensation of glyoxal with a p-nitrophenyl acetic acid followed by reduction to the free amine. These various amino compounds are acylated to give the corresponding acylamino compounds. These reactions may be represented as follows:

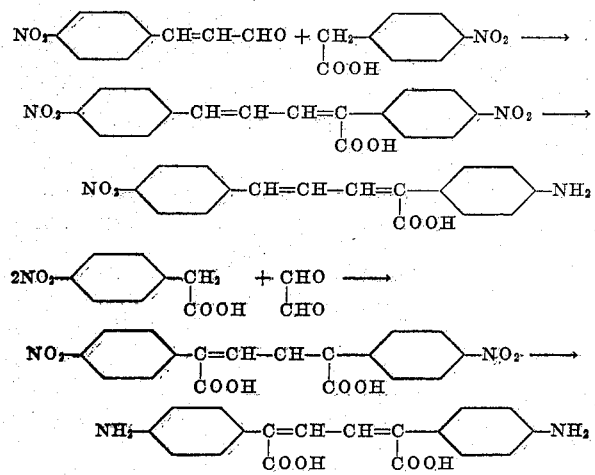

Among the acylamino benzaldehydes which are usable in the synthesis of compounds of this invention, there can be named the formyl, acetyl, propionyl, butyryl, benzoyl, para-toluyl, ortho-toluyl, ortho-methoxy benzoyl, dimethoxy benzoyl, and the like derivatives of para-aminobenzaldehyde and similar derivatives of 2-chlor-4-aminobenzaldehyde, 2-6-dichlor-4-aminobenzaldehyde, 4-amino-2-nitrobenzaldehyde, 4-amino-3-methylbenzaldehyde, 4-amino-6-chlor-3-methylbenzaldehyde, 3-methoxy-4-aminobenzaldehyde.

Among the para-nitrobenzaldehydes usable in alternative processes are para-nitrobenzaldehyde, 2-chlor-4-nitrobenzaldehyde, 3-hydroxy-4-nitrobenzaldehyde and 3-methoxy-4-nitrobenzaldehyde.

Other intermediates usable in the preparation of compounds of our invention are para-nitrocinnamaldehyde and halogen derivatives thereof, 2-4-dinitrocinnamaldehyde, 2-carboxy-4-nitrocinnamaldehyde and similar compounds and para-nitrophenyl-acetic acid, 2-chlor-4-nitrophenylacetic acid, 3-hydroxy-4-nitrophenylacetic acid and 3-methoxy-4-nitrophenylacetic acid and the like. In the case of the mono carboxy derivatives unsymmetrical derivatives can be prepared by the proper choice of the nitro cinnamaldehyde and nitro phenyl acetic acid to be used.

The acylamino derivatives of 1,4-bis(p-aminophenyl)-butadiene fluoresce and are readily usable as brighteners. As acyl groups one can use the benzoyl group; alkylbenzoyl groups, such as o-toluyl, p-toluyl; alkoxybenzoyl groups such as p-anisoyl, o-ethoxybenzoyl, 2,4-dimethoxybenzoyl, 2,5-diethoxybenzoyl and the like; amino derivatives such as p-aminobenzoyl; halogen derivatives such as p-chlorobenzoyl, 2,4-dichlorobenzoyl, and the like; or aliphatic acyl derivatives such as formyl, acetyl, propionyl, butyryl and the like. These acyl derivatives may be prepared either from the 1,4-diphenyl butadiene from the corresponding diphenyl butadiene carboxylic acids or from nuclear substitution products of any of these.

Alkyl derivatives of these amino compounds also fluoresce. Those without carboxy groups are especially good brighteners for non-cellulosic fibers. They are either prepared by the alkylation of 1,4-bis(p-aminophenyl)-1,3-butadiene or by synthesis starting with dialkylaminobenzaldehyde in the place of the acylaminobenzaldehyde. Alkylation of the aminophenylbutadiene can be carried out either by the use of alkyl sulfates or alkyl halides. Lower alkyl derivatives are best prepared by the use of the dialkyl sulfates while the alkyl halides are more available in the case of the higher alkyl groups. When mono-alkyl derivatives are desired, they are prepared by synthesis starting with an acylated monoalkyl amino benzaldehyde which is condensed with succinic anhydride followed by deacylation.

We have further found that azo dyes and pigments of interesting properties are preparable by the tetrazotization of the bis(aminophenyl)butadienes followed by coupling to the usual coupling components. The bis(aminophenyl)butadienes are especially good as Fast Bases when coupled into naphthols such as the arylides of beta-oxynaphthoic acid. One can also couple to sulfonated compounds such as naphthol sulfonic acids or amino naphthol sulfonic acids to produce direct dyes. Among these coupling components are 1-naphthol-2-sulfonic acid, 1-naphthol-2,7-disulfonic acid, 2-naphthol-4-sulfonic acid, 2-naphthol-3,6-disulfonic acid, 2-naphthol-3,6,8-trisulfonic acid, 8-amino-1-naphthol-5,7-disulfonic acid, 8-amino-1-naphthol-3,6-disulfonic acid, and the like. The preparation of direct dyes is not limited to naphthols since any other sulfonated coupling component can equally be used. With relation to the direct dyes, it was obviously not predictable whether increase in the length of the molecule would have a harmful effect on the substantivity of the dyes for cellulosic materials. We have found in fact that the substantivity is not impaired.

We have also found that the butadiene structure has a bathochromic effect on the shade when compared with dyes from the corresponding stilbenes or benzidines. This is a very important observation since it provides a means to obtain very greenish blue shades which cannot normally be obtained with simple azo dyes. This is particularly true of dyes derived from 1,4-bis(3-methoxy-4-aminophenyl)butadiene and related compounds. These dyes are of particular interest because the methoxy groups permit metallization when the coupling component has metallizable groups, such as hydroxyl or amino ortho to the azo group, and metallization generally leads to improved fastness to light. Dyes of this type may be represented as follows:

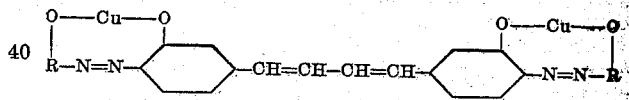

where R is the residue of coupling component. Examples of coupling components which may be used are beta naphthol, 3-hydroxy-2-naphthoic arylides, 2-naphthol-6-sulfonic acid, 2-naphthol-3,6-disulfonic acid, 2-naphthol-6,8-sulfonic acid, 7-amino-1-naphthol-3-sulfonic acid, and the like.

Our invention can be illustrated by the following examples in which parts are by weight unless otherwise specified.

*Example 1*

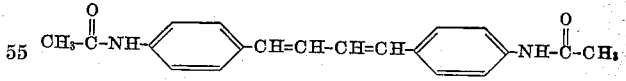

A mixture of 89.5 parts of p-acetaminobenzaldehyde, 27.5 parts of succinic anhydride, 57.5 parts of litharge, and 75 parts of acetic anhydride is stirred at the boil until the condensation is complete. It is then cooled and diluted with 75 parts of acetic acid followed by 70 parts of methanol. The precipitated product is then isolated by filtration and reslurried in 250 parts of methanol. This slurry is boiled, cooled, and filtered. The product obtained is 1,4-bis(p-acetaminophenyl)butadiene. It can be recrystallized from nitrobenzene and other solvents to give a sample of good analysis for this compound.

By starting with p-benzamide benzaldehyde, p-(2-methoxy-4-methylbenzoylamino)benzaldehyde, or p-(2,5-diethoxybenzoylamino)benzaldehyde, the corresponding 1,4-bis(p-acylaminophenyl)butadienes are formed.

By starting with 4-acetamido-2-chlorobenzaldehyde, 4-acetamido-2,6-dichlorobenzaldehyde, 4-acetamido-2-nitrobenzaldehyde, 4-acetamido-3-methylbenzaldehyde or 4-acetamido-3-methoxybenzaldehyde, the corresponding 1,4- bis(acetamidophenyl)butadienes further substituted in the aromatic rings are formed.

Example 2

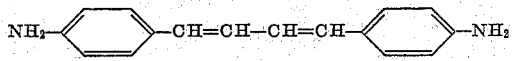

A mixture of 3.2 parts of the above product of Example 1, 5.6 parts of potassium hydroxide, and 25 parts of anhydrous alcohol is stirred at the boil until hydrolysis is complete. The mixture is then poured into 100 parts of cool water and the precipitated solid is isolated by filtration and washing.

A mixture of 4.8 parts of the product from Example 1, 24 parts of ethanol, and 18 parts of conc. hydrochloric acid is refluxed until hydrolysis is complete. After the mixture is cooled, the solid is isolated by filtration, washed with ethanol, and then with ether. The dihydrochloride is transformed to the free base by dissolving in hot water, alkalizing, and isolating in the usual way. The solid, identical to the product produced by the procedure of the first paragraph of this example, is purified by recrystallization from toluene giving brownish-yellow granules.

Example 3

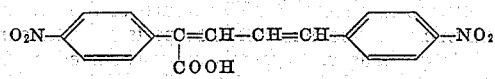

4.53 parts of p-nitrophenyl acetic acid and 2.75 parts of litharge are thoroughly mixed. The mixture is then slurried in 20 parts of acetic anhydride and the slurry is heated to boiling. 4.43 parts of p-nitro-cinnamaldehyde is added and the mixture is heated at the boil until reaction is substantially complete. The precipitated product is filtered hot and washed with water. The crude product may be purified by reprecipitation from sodium carbonate solution with acid and can also be recrystallized from acetic acid. It is 1,4-bis(p-nitrophenyl)-1-carboxy-1,3-butadiene.

When an equivalent quantity of 2,4-dinitrophenyl-acetic acid is used, one obtains 1-(2,4-dinitrophenyl)-4-(4-nitrophenyl)-1-carboxy-1,3-butadiene.

Example 4

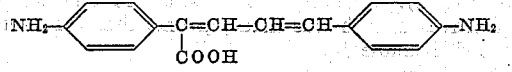

One part of the product of Example 3 is slurried in 25 parts of concentrated ammonia and the mixture is heated to the boil. Five parts of ferrous-sulfate are added gradually and the reaction mixture is boiled until the reduction is substantially complete. The mixture is clarified by filtration and the filtrate is carefully neutralized with dilute hydrochloric acid. The precipitated product is isolated by filtration and washing. It may be purified by reprecipitation from sodium carbonate solution with acid.

Example 5

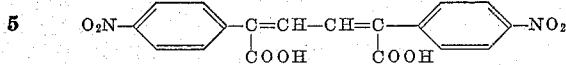

5.6 parts of sodium hydroxide is dissolved in 100 parts of water. 7.24 parts of p-nitrophenyl acetic acid is added and the solution is cooled. 3.86 parts of 30% aqueous glyoxal is then added and the mixture is stirred at 0° C. for a short time followed by stirring at room temperature until the reaction is substantially complete. The product is isolated by filtration and dissolved in boiling water. The solution is salted with saturated brine and cooled to room temperature. The light yellow orange solid, which separates, is isolated by filtration and washing. It is the disodium salt of 1,4-bis(p-nitrophenyl)-1,4-bis(carboxy)-1,3-butadiene.

Substituted 1,4-bis(p-nitrophenyl)-1,4-bis(carboxy)1,3-butadienes in which the aromatic ring are correspondingly substituted, are obtained when there is substituted for the p-nitrophenyl acetic acid equivalent amounts of 2-chloro-4-nitro-phenylacetic acid, and 3-methoxy-4-nitrophenyl acetic acid.

Example 6

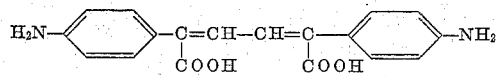

The procedure of Example 4 is followed, using 1.16 parts of the product of Example 5 instead of 1.0 part of the product of Example 3. The product is 1,4-bis-(p-aminophenyl)-1,4-bis(carboxy)-1,3-butadiene.

Example 7

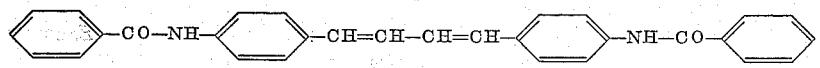

23.6 parts of the product of Example 2 is mixed with 250 parts of pyridine. 17 parts of benzoyl chloride is added gradually and the mixture is stirred at 50°–75° C. until acylation is complete. The mixture is diluted with 500 parts of water, sodium carbonate added, and the pyridine is removed by distillation. The product, 1,4-bis(p-benzoylaminophenyl)-1,3-butadiene, is isolated by filtration and washing.

By starting with 18 parts of o-toluyl chloride, 19 parts of p-anisoylchloride, 24 parts of 2,4-dimethoxybenzoyl-chloride, or 21 parts of o-chlorobenzoylchloride, the corresponding bis(acylaminophenyl)butadiene is prepared by the same procedure.

Example 8

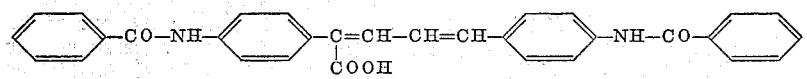

The procedure of Example 7 is followed using 28 parts of the product of Example 3 to give 1,4-bis(p-benzoyl-aminophenyl)butadiene - 1 - carboxylic acid. Similarly, when equivalent amounts of other acid chlorides, for example anisoyl chloride, o-ethoxybenzoyl and 2,4-dimethoxy-benzoyl chloride, are substituted for the benzoyl chloride there is obtained the corresponding 1,3-bis(alkoxybenzamidophenyl)-1-carboxy butadiene.

Example 9

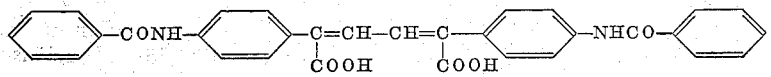

The procedure of Example 7 is followed using 32.4 parts of the product of Example 5 to give 1,4-bis-(benzamidophenyl)-1,4-dicarboxy butadiene.

Similarly, equivalent amounts of other acid chlorides such as anisoyl chloride, o-ethoxybenzoyl chloride and 2,4-dimethoxybenzoyl chloride may be substituted for the benzoyl chloride to give the corresponding alkoxybenzamido butadiene dicarboxylic acid.

naphthols prepared in the usual manner are dyed with the tetrazo solution. The following colors are obtained:

| | |
|---|---|
| 3-hydroxy-2-naphthoic anilide | reddish-blue. |
| 2'-methyl-3-hydroxy-2-naphthoic anilide | Do. |
| 4,4'-bis(acetoacetamido)3,3'-dimethyl biphenyl | yellow-orange. |
| 2',5'-dimethoxy-3-hydroxy-2-naphthoic anilide | maroon. |
| 3'-nitro-3-hydroxy-2-naphthoic anilide | reddish-blue. |
| 2'-ethoxy-3-hydroxy-2-naphthoic anilide | blue. |
| 2'-methyl-4'-methoxy-2-hydroxy-11-benzo(a)carbazole-3-carboxanilide | yellow-gray. |
| 2-acetoacetamido-6-ethoxy benzothiazole | reddish-tan. |

Example 14

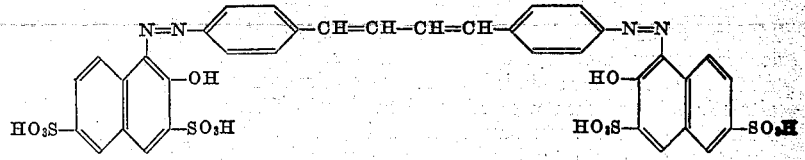

Example 10

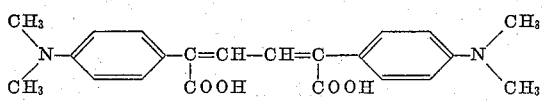

A mixture of 23.6 parts of the product of Example 6 with 250 parts of water and 15 parts of sodium carbonate is alkylated with excess dimethyl sulfate, sodium hydroxide being added as needed to maintain alkalinity to phenolphthalein. After alkylation is complete the reaction mixture is then heated to 80°–90° C. for a short time to hydrolyze any methyl ester which is present. Acidification (after clarification if necessary) precipitates the 1,4-bis(p-dimethylaminophenyl)-1,4-dicarboxybutadiene.

A suspension of 1.08 parts of 1,4-bis(p-aminophenyl)-1,3-butadiene in 25 parts of water strongly acidified with hydrochloric acid was tetrazotized in the usual fashion at 10° C. The tetrazo solution was clarified and added portionwise to a solution of 2.86 parts of 2-naphthol-3,6-disulfonic acid disodium salt in 50 parts of water containing 0.4 part caustic. The mixture was stirred until coupling was essentially complete, with additions of soda ash when necessary to maintain a positive test on Brilliant Yellow paper. The coupling product was isolated and purified further by reprecipitating it from a solution in dilute caustic by addition of sodium acetate crystals.

The dye exhausted rapidly onto cotton giving a blue shade, appreciably greener in hue than the corresponding dyes from 4,4'-diaminostilbene and benzidine.

Example 15

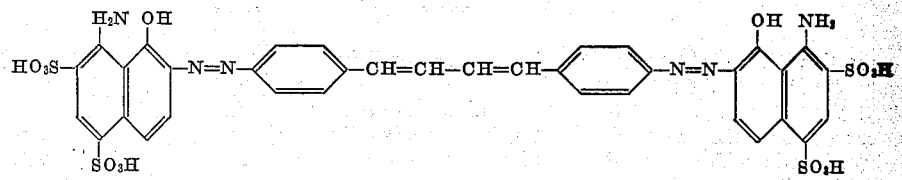

Example 11

The procedure of Example 1 is followed, substituting 83 parts of p-nitrobenzaldehyde for the acetylaminobenzaldehyde. The resultant 1,4-bis(p-nitrophenyl)-butadiene can be reduced by the procedure of Example 4 to give a product identical with that of Example 2.

Example 12

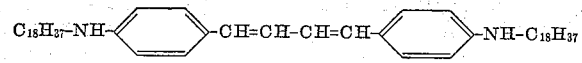

The procedure of Example 1 is followed, using 228 parts of p-octadecylacetaminobenzaldehyde (prepared by treating p-aminobenzaldehyde with octadecyl bromide, followed by acetylation) in place of acetaminobenzaldehyde. The resulting 1,4-bis(p-octadecylacetaminophenyl)butadiene is hydrolyzed by the procedure of Example 2 to give 1,4-bis(p-octadecylaminophenyl)butadiene.

By using the similarly prepared p-butylacetaminobenzaldehyde in place of the octadecyl compound, 1,4-bis(p-butylaminophenyl)butadiene is prepared.

Example 13

The product of Example 2 is tetrazotized in the usual manner. Cotton cloths previously printed with pastes of The procedure of Example 14 is followed substituting an equivalent amount of Chicago acid (1-amino-8-naphthol-2,4-disulfonic acid) for R-salt (2-naphthol-3,6-disulfonic acid). The product dyes cotton and rayon an attractive greenish-blue shade, greener than that from the dye of Example 14.

We claim:
1. 1,4-bis(p-aminophenyl)butadienes in which the said butadiene chain is otherwise unsubstituted except when at least one of the terminal carbon atoms is substituted by a carboxyl group.
2. 1,4-bis(p-aminophenyl)butadiene.
3. 1,4-bis(p-aminophenyl)butadienes, in which the butadiene chain has a carboxyl group attached to at least one of the terminal carbons, the said butadiene chain being otherwise unsubstituted.
4. 1,4-bis(p-aminophenyl)butadiene-1-carboxylic acid.
5. 1,4-bis(p-aminophenyl)butadiene - 1,4 - dicarboxylic acid.
6. 1,4-bis-acylaminophenylbutadienes in which the said butadiene chain is otherwise unsubstituted except when at least one of the terminal carbon atoms is substituted by a carboxyl group, and in which the said acyl group is chosen from the group consisting of benzoyl, loweralkylbenzoyl, lower-alkoxybenzoyl, aminobenzoyl, chlorobenzoyl, and lower alkanoyl.
7. 1,4-bis-acetamidophenylbutadienes, in which the said butadiene chain is otherwise unsubstituted except when at least one of the terminal carbon atoms is substituted by a carboxyl group.

8. 1,4-bis-monoalkylaminophenylbutadienes, in which the said butadiene chain is otherwise unsubtituted except when at least one of the terminal carbon atoms is substituted by a carboxyl group.

9. 1,4-bis-dialkylaminophenylbutadienes, in which the said butadiene chain is otherwise unsubstituted except when at least one of the terminal carbon atoms is substituted by a carboxyl group.

10. The compound of the formula

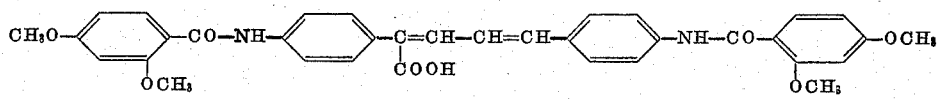

and its soluble salts.

11. The compound of the formula

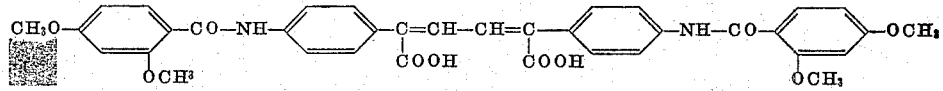

and its soluble salts.

12. 1,4-bis(p-substituted phenyl)butadienes in which said para substituent is selected from the group consisting of amino, benzoylamino, lower-alkylbenzoylamino, lower-alkoxybenzoylamino, aminobenzoylamino, chlorobenzoylamino and lower-alkanoylamino, and alkylamino, the said butadiene chain being otherwise unsubstituted except when at least one of the terminal carbon atoms is substituted by a carboxyl group.

References Cited in the file of this patent

UNITED STATES PATENTS

| | | |
|---|---|---|
| 2,098,782 | Hopff et al. | Nov. 9, 1937 |
| 2,537,950 | Allen | Jan. 16, 1951 |
| 2,624,757 | Bersworth | Jan. 6, 1953 |
| 2,660,606 | Newby | Nov. 24, 1953 |
| 2,665,309 | Bruce | Jan. 5, 1954 |